UNITED STATES PATENT OFFICE.

JOHN B. INGRAM, OF LOS ANGELES, CALIFORNIA.

FRUIT-SNOW.

1,167,563.     Specification of Letters Patent.     Patented Jan. 11, 1916.

No Drawing.     Application filed August 8, 1914. Serial No. 855,889.

*To all whom it may concern:*

Be it known that I, JOHN B. INGRAM, a citizen of the United States, residing at Los Angeles, in the county of Los Angeles, State of California, have invented a new and useful Fruit-Snow, of which the following is a specification in such full and clear terms as will enable those skilled in the art to construct and use the same.

This invention relates to an artificial snow known as fruit snow and its object is to produce a body of frozen material which can be served and eaten without requiring an ice cream freezer for making the same.

The fruit snow is produced by shaving a body of ice, mixing the ice with a solution of mint and such fruit as it is desired to use. (The solution of mint used contains the commercial mint extract in alcohol in such quantity as to make the solution palatable and at the same time to give the cooling effect of mint flavored solutions.) This mixture is then gently pressed into cylindrical molds with such a pressure as is necessary to form it into a more or less compact body, from which body the snow may be served, any suitable fruit such as pineapple, peaches or strawberries may be mashed up in small particles and mixed with the snow. The fruit may be used in such quantity as may be desired. It is also desirable to have the finished product appear in several different layers, each layer being differently colored.

Having thus described my invention what I claim as new and desire to secure by Letters Patent of the United States is as follows:

A fruit snow product comprising a mixture of shaved ice and mashed fruit, flavored with mint, the entire mass being pressed into cylindrical molds and having several layers differently colored.

In testimony whereof I have hereunto set my hand this 15 day of July A. D. 1914, in the presence of the two subscribed witnesses.

JOHN B. INGRAM.

Witnesses:
    ALICE A. HENRY,
    CARRIE B. NASH.